Patented Apr. 3, 1951

2,547,158

UNITED STATES PATENT OFFICE 2,547,158

PREPARATION OF THIOPHOSPHORYL CHLORIDE

Kenneth L. Godfrey, Dunbar, W. Va., assignor to Monsanto Chemical Company, St. Louis, Mo., a corporation of Delaware No Drawing. Application April 4, 1946, Serial No. 659,659

4 Claims. (Cl. 23—14)

The present invention relates to a method for preparing thiophosphoryl chloride.

An object of this invention is to provide a simple, satisfactory method for preparing thiophosphoryl chloride. A further object is to provide an efficient method of obtaining thiophosphoryl chloride directly from sulfur and phosphorus trichloride.

While there is no dearth of methods which result in the formation of thiophosphoryl chloride, none meet the requirements for practical use. After examining eight methods for the preparation of thiophosphoryl chloride DeFazi concluded that none were wholly satisfactory and proposed to prepare this product by reacting carbon tetrachloride with $P_2S_5$ in a sealed tube at 180°–200° C. [Atti II Congresso naz. Chim. pura Applicata (1926), 1293-4]. This reaction results in the formation of carbon disulfide as a by-product and in addition, the necessity for superatmospheric pressures is objectionable. While phosphorus trichloride is known to combine directly with sulfur, this reaction has never been wholly satisfactory. The efficiency of the conversion at atmospheric pressure is low whether the sulfur and phosphorus trichloride are refluxed together or whether phosphorus trichloride vapor is passed into molten sulfur so that again resort has been had to superatmospheric pressures.

In accordance with the present invention it has been found that phosphorus trichloride and sulfur combine efficiently at atmospheric pressure providing the sulfur is dissolved in a high boiling solvent. Stable high boiling solvents inert to phosphorus trichloride and sulfur are employed to keep the sulfur in solution. The boiling point of the solvent, of course, determines the limiting value of the temperature and it is desirable to employ solvents which boil above 200° C. at atmospheric pressure. Suitable solvents comprise high boiling hydrocarbons as for example diphenyl naphthalene, ethyl naphthalene, methyl diphenyl, and methyl naphthalene. However, it is preferred to employ chlorinated aromatic hydrocarbons, as for example trichloro diphenyl, trichloro naphthalene, tetrachloro diphenyl, tetrachloro naphthalene, pentachloro diphenyl, pentachloro naphthalene, hexachloro naphthalene, chlorinated methyl naphthalene, chlorinated ethyl naphthalene, the trichloro benzenes, the tetrachloro benzenes and coal tar oil cuts boiling above 200° C.

The reaction is affected by passing the phosphorus trichloride into the hot solution of the sulfur. The temperature of the sulfur solution should be at least 140° C. but better in the vicinity of 170–180° C. The thiophosphoryl chloride may be distilled from the reaction mixture as it is formed.

The following specific example illustrates the invention in detail but is not to be taken as limitative of the invention.

To substantially 1800 parts by weight of Aroclor 1242, a chlorinated diphenyl manufactured by Monsanto Chemical Company, there was added substantially 640 parts by weight of sulfur (about 20 atomic weight proportions). The mixture was gradually heated to dissolve the sulfur and when the temperature reached 175–180° C. phosphorus trichloride was added in a slow stream to the hot sulfur solution. The reaction vessel was fitted with an efficient stirrer, thermometer and condenser for the distillate in addition to an inlet tube for the $PCl_3$. The inlet tube terminated in an alundum distributor below the surface of the liquid which served to feed the phosphorus trichloride into the solution uniformly. A slight positive pressure was applied to feed in the phosphorus trichloride. Where desired the $PCl_3$ may be vaporized in a separate vessel and passed into the sulfur solution in vapor instead of liquid form. After the system reached equilibrium it was possible to adjust the rate of feed so that nearly complete conversion to the phosphoryl chloride took place, the product being distilled out as it was formed. Thus, the vapor temperature of the distillate gradually rose to 120° C. and above where it remained during the run. Approximately 825 parts by weight of phosphorus trichloride was added in a little more than five hours. In order to determine the extent of conversion, any $PSCl_3$ or $PCl_3$ remaining in the sulfur solution was stripped out by heating under a 55 mm. vacuum. Fractionations of the entire distillate resulted in 851 parts by weight of thiophosphoryl chloride, B. P. 121.5–124.5/741 mm. The phosphorus trichloride fraction was 99 parts by weight. These figures represent conversion of about 84% of the $PCl_3$ to $PSCl_3$ after one pass through the hot sulfur solution.

The present invention is limited solely by the claims attached hereto as part of the present specification.

What is claimed is:

1. The process of preparing thiophosphoryl chloride which comprises adding phosphorus trichloride to a solution of sulfur in a chlorinated diphenyl at a temperature in the vicinity of 175–180° C. and distilling off the product as it is formed.

2. The process of preparing thiophosphoryl chloride which comprises heating at a temperature above 140° C. phosphorus trichloride and a solution of sulfur in solvent boiling above 200° C., continuously adding phosphorus trichloride at approximately the rate at which it is used up in the reaction and continuously recovering the thiophosphoryl chloride by distillation from the solvent mixture.

3. The process of preparing thiophosphoryl chloride which comprises heating at a temperature above 140° C. phosphorus trichloride and a solution of sulfur in a chlorinated biphenyl, continuously adding phosphorus trichloride at approximately the rate at which it is used up in the reaction and continuously recovering the thiophosphoryl trichloride by distillation from the solvent mixture.

4. The process of preparing thiophosphoryl chloride which comprises heating a solution of phosphorus trichloride and sulfur in a solvent, boiling above 200° C. and inert to sulfur and phosphorus trichloride, at a temperature of above 140° C. and recovering the product by distillation from the solvent.

KENNETH L. GODFREY.

REFERENCES CITED

The following references are of record in the file of this patent:

Mellor: "Inorganic and Theoretical Chemistry," vol. 8, Longmanns, Green Co. (1928) page 1074.

Mellor: "Inorganic and Theoretical Chemistry," vol. 10 (1930), page 97.